United States Patent
Pyötsiä et al.

(10) Patent No.: US 6,317,701 B1
(45) Date of Patent: *Nov. 13, 2001

(54) FIELD DEVICE MANAGEMENT SYSTEM

(75) Inventors: Jouni Pyötsiä, Helsinki; Harri Cederlöf, Vantaa, both of (FI)

(73) Assignee: Metso Field Systems Oy, Helsinki (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,068

(22) Filed: Sep. 4, 1998

(30) Foreign Application Priority Data

Jun. 17, 1998 (FI) .......................................... 981406

(51) Int. Cl.⁷ .......................... G06F 15/00; H04M 11/00
(52) U.S. Cl. .......................... 702/188; 702/182; 702/183; 702/184; 700/11; 706/50; 709/223; 340/825.49
(58) Field of Search .................... 702/183, 182, 702/186; 700/11; 709/223, 225; 710/109; 706/45, 46, 50; 340/825.49; 379/106.1

(56) References Cited

U.S. PATENT DOCUMENTS

| | | | |
|---|---|---|---|
| 5,634,039 | * | 5/1997 | Simon et al. .......................... 707/102 |
| 5,768,119 | | 6/1998 | Havekost et al. .......................... 700/4 |
| 5,918,233 | * | 6/1999 | La Chance et al. .................. 707/104 |

FOREIGN PATENT DOCUMENTS

| | | |
|---|---|---|
| 196 15 190 | 10/1997 | (DE) . |
| 84/02592 | 7/1984 | (WO) . |
| 97/29408 | 8/1997 | (WO) . |
| 97/29409 | 8/1997 | (WO) . |
| 97/50021 | 12/1997 | (WO) . |
| 98/10341 | 3/1998 | (WO) . |
| 98/14848 | 4/1998 | (WO) . |
| 98/14855 | 4/1998 | (WO) . |

* cited by examiner

Primary Examiner—Kamini Shah
(74) Attorney, Agent, or Firm—Pillsbury Winthrop LLP

(57) ABSTRACT

The invention relates to field management in industrial process systems and similar systems. In the invention, maintenance management systems of industrial processes of separate plants located geographically apart from each other are networked in such a way that they may communicate with each other or with a centralized maintenance management server and transmit information on maintenance parameters of field devices of different types. As a result, experience obtained in one industrial process can be transferred to other respective industrial processes and applications. By utilizing this globally collected cumulative information, it is possible to improve and specify the diagnostics of the separate local maintenance systems (6) essentially faster than in case if the local maintenance management system were independent and the diagnostics were changed on the basis of local experience only.

15 Claims, 3 Drawing Sheets

FIELD DEVICE MANAGEMENT SYSTEM

BACKGROUND OF THE INVENTION

The invention relates to field device management in industrial process systems and similar systems.

FIELD OF THE INVENTION

Field devices for industrial processes generally signify regulating devices, control devices, sensors, transducers, and the like, directly connected to the process. A typical field device is a control valve provided with a valve controller, such as the valve controller ND800 of Neles Controls Oy. So-called intelligent field devices are provided with a control logic or software, which makes it possible to control the field device locally for instance by means of a suitable control algorithm, to collect status and measurement data and/or to communicate with a field management system in accordance with a field communication protocol, such as HART (Highway Addressable Remote Transducer). In addition, intelligent field devices contain that much diagnostics at present that a field device is capable of informing of its failure. This information can be utilized for recognizing the device requiring maintenance, which reduces the maintenance costs because unnecessary device testings are avoided. Moreover, the utilization ratio of a plant (factory) increases when unanticipated shutdowns decrease.

Typical field management systems are PC programs provided with graphical user interfaces and comprising properties as follows: configuration of field device, configuration database, maintenance control of field device on the basis of status data received from field device, and status database of field device. Examples of commercial field management systems are: Field Manager manufactured by Fisher-Rosemount Inc.; Documint manufactured by Honeywell Inc.; Cornerstone manufactured by Applied Technologies Inc.; Smartvision manufactured by Elsag-Bailey.

The maintenance control function is typically automatic and can be configurated by the user. At maintenance control, a software scans the field devices as desired by the user and stores the status data desired by the user in the status database together with a time stamp. The status database can be browsed by means of a graphical user interface, which may be located anywhere in the plant. In this way, universal status data, which are very limited as far as e.g. maintenance data are concerned, are received from the field device. Status data items typically describing the condition of the device are: in condition and out of condition. This is often not enough for predictive or preventive maintenance.

Plant operators use so-called control room applications when running the plant by actual process control automation systems. Because the operator monitors the process day by day, he could start a maintenance step of a predetermined field device in time, if he were informed of the condition of said field device. A problem is to bring an information on a failure in a field device to the knowledge of the operator or maintenance person of the plant, because automation systems do not support digital field communication protocols, such as HART. A reason for this is that they are primarily regarded as configuration protocols of a field device or the communication protocol does not support a transmission of operating status data of the field device. The diagnostics of the field device is clearly an area belonging to the field device supplier and not to the supplier of the actual automation system. The present control room applications show only the data required for operating the process, and the operator has to check the status of the field devices relating to said process in a separate field management software. To use a separate field device management software in the control room is problematic for the operator, because there is no connection between the field devices displayed by the software and the process to be monitored. This leads to the fact that the operator primarily monitors the process and does not react to the condition of the field device until it causes interference with the process.

The significance of diagnostics in intelligent field devices will continue to increase in a field bus environment. It is then especially important that the field device management concept and also the outputs and reports provided by it are clear and simple enough for the users. The present methods are not simple and sophisticated enough for this purpose. It is to be assumed that the two-way communication of the field devices will provide a flood of information in maintenance control software and automation systems. Accordingly, they rather increase the amount of work than decrease it. On the other hand, in order to achieve a simple and easy-to-use concept of diagnostics, the tools already existing in the control rooms should be utilized as much as possible. User interfaces of new application programs are not desired in the control room, because they require further training and maintenance and increase the complexity of running and monitoring the process. Actually, a user-friendly diagnostic system should not be visible to the user as a software provided with a separate user interface at all.

BRIEF DESCRIPTION OF THE INVENTION

An object of the invention is a maintenance management of field devices, which is reliable, simple and easy to use for the user.

This is achieved by a system for the maintenance management of field devices in industrial processes, each of them comprising a local maintenance management system. The local maintenance management systems of said industrial processes are arranged to form a network and to communicate with each other and/or with a centralized maintenance management unit and to transmit information relating to the maintenance management of field devices so as to enable learning on network level.

Another object of the invention is a maintenance management system supervising field devices in industrial processes. The maintenance management system is arranged to communicate with respective maintenance management systems of industrial processes of other plants located geographically apart from each other, either directly or over a centralized maintenance management unit, to transmit and receive information on detected properties of managed field device types, and to adjust maintenance management parameters of the field device types on the basis of said received data in a self-learning manner.

Still an object of the invention is a server for the maintenance management of field devices in industrial processes, each of them comprising a local maintenance management system. The server is connected to a network of local maintenance management systems and controls an exchange of information relating to the maintenance management of the field devices, the exchange taking place between the local maintenance management systems for learning on network level.

The basic idea of the invention is to network the maintenance management systems of industrial processes of separate plants located geographically apart from each other in such a way that they are capable of communicating with each other or with a centralized maintenance management unit and transmitting information on maintenance parameters of different field device types. In this way, the experience obtained from or observed in one industrial process can be transferred to other industrial processes and applications of similar plants as well. By utilizing this globally collected cumulative information, it is possible to improve and specify the diagnostics of the separate local maintenance management systems essentially faster than in case if a local maintenance management system were independent and the diagnostics were changed on the basis of local experience only.

In an embodiment of the invention, local systems communicate directly with each other. Each local maintenance management system is then preferably arranged to control local maintenance management parameters independently on the basis of the information received from the other local maintenance management systems.

In a preferred embodiment of the invention, the local systems communicate with or through a centralized maintenance unit. The centralized unit or its staff analyzes the received information and, if some new information is discovered to be significant, transmits the information or a control instruction created on the basis of the received information to all other local systems. The centralized unit may also analyze collected data by different statistical and mathematical methods and produce control data, which are transmitted to all local systems in the network. For instance, a field device manufacturer may monitor all its field devices in different parts of the world and adjust an optimal performance and optimal maintenance intervals for them. This means a less amount of unnecessary maintenance visits because of too short maintenance intervals, and on the other hand, a lower number of production shutdowns in factories because of too long maintenance intervals.

The communication is preferably based on existing general methods, such as electronic mail, DDE, HTML, short message, Internet.

BRIEF DESCRIPTION OF THE DRAWINGS

The invention will now be described in more detail by means of preferred embodiments, with reference to the attached drawings, in which.

DETAILED DESCRIPTION OF THE INVENTION

The present invention can be applied to all industrial processes or the like comprising intelligent field devices. Intelligent field devices signify here any device relating to a process or an automated system or a control thereof which shall be controlled and which is capable of producing information describing the condition of the device directly or indirectly, this information being known as condition data. A typical intelligent field device of this kind is a control valve provided with a valve guide.

Figure 1:
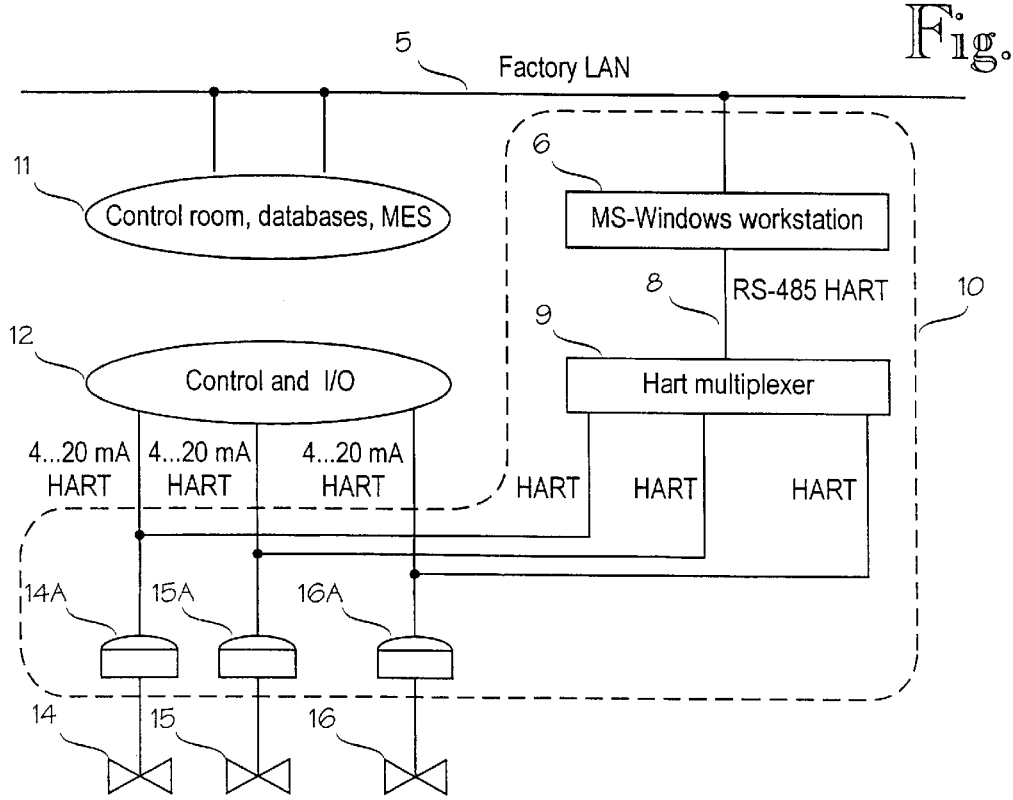
FIG. 1 shows a local maintenance management system of field devices connected to a process automation system of a factory.

FIG. 1 shows a general block diagram of a process automation system and, joined thereto, a maintenance management system of field devices according to the invention. The automation system comprises control room programs and databases 11 as well as process control programs and an I/O part 12. The control and I/O part 12 is connected via buses in accordance with HART standard to intelligent field devices constituted by control valves 14, 15, 16 and valve controllers 14A, 15A, 16A. The valve controller may be for instance an ND 800 of Neles Controls Oy. HART (Highway Addressable Remote Transducer) is based on transmitting digital data together with a conventional 4 to 20 mA analog signal. HART enables a two-way communication, by means of which intelligent field devices can be controlled and data can be read from them. A HART protocol follows the reference model of a protocol stack by OSI (Open System Interconnection), which model has been developed by International Organization for Standardization (ISO). In layers 7 (application layer), HART instructions are transmitted. A HART instruction set contains universal commands understood by all field devices and device-specific commands providing functions which are restricted to an individual device (device type). The HART protocol enables a point-to-point configuration, in which there is a separate bus (pair of wires) between each field device and a master unit, or a multidrop configuration, in which up to 15 field devices are connected to the same field bus (pair of wires). The HART protocol is described in greater detail for instance in the publication HART Field Communication Protol: An Introduction for Users and Manufacturers, HART Communication Foundation, 1995. The HART protocol has also become industrial standard. However, it is to be understood that the type or implementation of a field communication interface, i.e. the field bus and the protocol used by it, is not significant for the present invention.

The condition of field devices is monitored by means of a field device maintenance management system 10 according to the invention, which system collects data from the field devices. For this purpose, each field device 14, 15 and 16 is connected via a respective field bus to a conventional HART multiplexer 9, which again is connected via an RS-485 bus 8 to a PC 6. The operating system of PC 6 is Windows 95/98 or Windows NT, for instance. Moreover, a work station 6 is connected to a local area network LAN of the factory (over which network it may communicate with control room software, for example).

The work station 6 contains a maintenance management software for field devices. The purpose of the software is to collect data from the intelligent field devices 14 to 16. This data collecting is fully automatic and requires no staff. On the basis of the collected data, the condition of the device can be analyzed and a message informing of the condition can be sent to another system, such as to the other parts of the automation system of the factory, e.g. to the display of a control room application.

Figure 2:
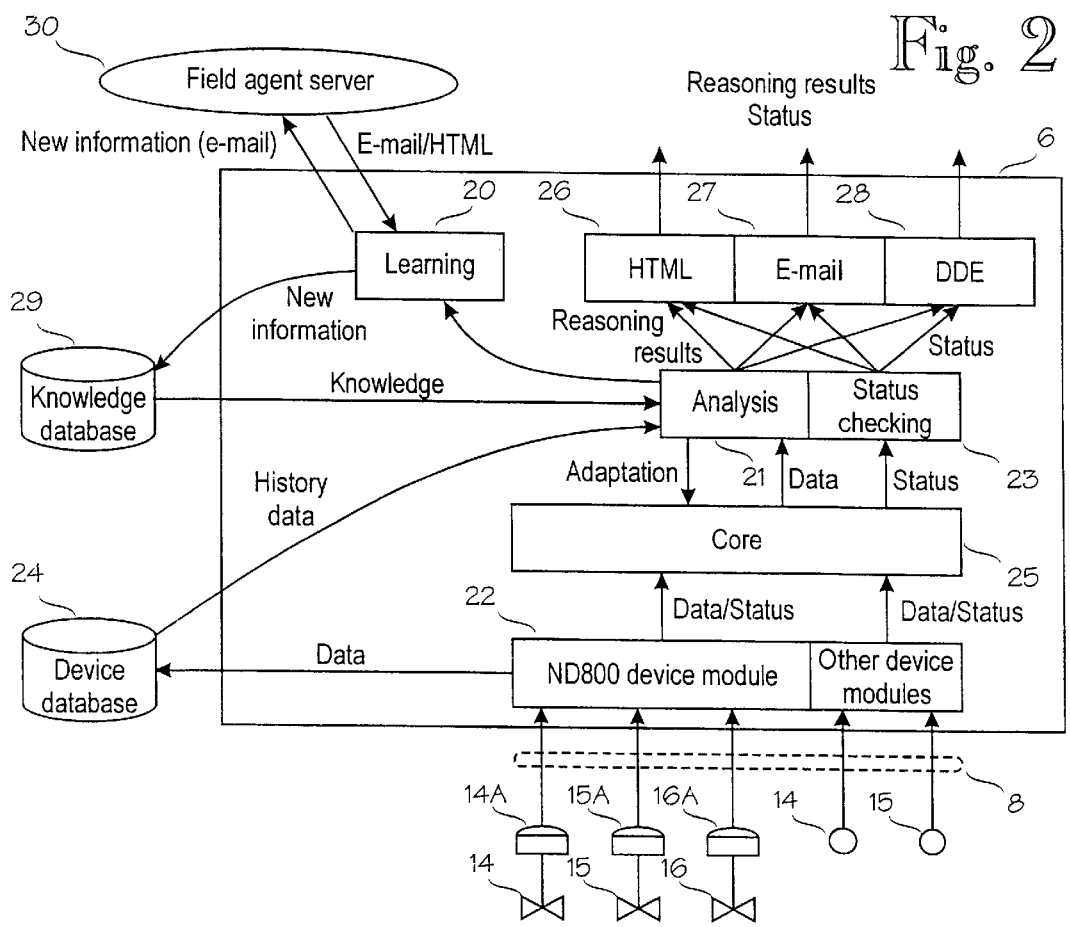
FIG. 2 shows components of a field agent according to a preferred embodiment of the invention.

FIG. 2 is a general block diagram illustrating components of the field device maintenance management system or software according to a preferred embodiment of the invention.

Device modules are independent program components using a field bus in a manner they desire. A device module preferably is specific for each device type (not device-specific). For instance, two different control valves or control valves of different manufacturers may represent different types of device. Two identical field devices having different uses or wanting to monitor different matters may also belong to different device types. Generally, field devices requiring mutually different applications (device agents) for collecting and analyzing data and for producing status data can be classified to different device types. A device module contains all necessary data and instruction sets for reading, analyzing and/or processing the status and diagnostic data of field devices of a predetermined type and also for producing status data for the device. Moreover, the device module 22 may store collected raw data and condition data of the device derived from them in a device database 24 for a later use. A more accurate diagnosis of the field device may then be made on the basis of the raw data by device-specific software, as by Valve-Manager in the case of ND800 valve controller. The device modules 22 have a simple interface to a software core 25, over which the device module 22 may send data and an information on the status or condition of each field device to the core 25. It is also possible that an intelligent field device analyzes its condition itself, whereby the raw data received over the field bus already is processed to some extent. In this case, the device module 22 may process the data further, for instance on the basis of the data it has received from the process automation system, or transmit the data as such to the core 25.

The software core 25 comprises a timer and a management of device modules and field devices. The task of the timer is to give each device module 22 separately a permission to use the HART field bus. The priority level of the field devices can be changed, whereby a higher number of data retrieval accesses in a time unit may be given to a predetermined field device than to another field device. The number of the device-specific priority levels may be for instance four: no data are retrieved from the field device, data are retrieved from the field device normally, data are retrieved from the field device twice as often as normally and data are retrieved from the field device four times as often as normally. Additionally, the timer may give the device module 22 a permission to collect timed data from the field devices at suitable intervals, for instance once an hour, a day, a week, a month or a year, which data are not urgent, but useful for preventive maintenance, for instance.

For the maintenance management of the device agents, the core 25 contains data of the device modules 22 of the system. For the field management, the core 25 contains data of the field devices subjected to the management of each device module 22.

The core 25 forwards data and status data to an analyzing block 21 and to a status checking block 23 and may receive adaptation instructions from the analyzing block 21 for changing the priority level of a predetermined device, for instance.

The status checking block 23 preferably stores the status data, transmitted by the device modules 22 via the core 25, in a field device-specific database. In other words, the status data of each field device are stored separately in the block 23. When the status checking block 23 receives the status data of a predetermined field device from the device module, it compares this status data with the preceding status, which is stored in the respective field device database in the checking block 23. If the status has changed, i.e. a change has occurred in the condition of the field device, the checking block 23 sends the changed status data forward over an open communication interface, whereby the change in the condition of the field device appears at the user interface of the control room application, for instance. Such a transmission principle is called exception-based, because only the changes in the field device status are informed forward. The checking block 23 transmits the status messages to one or more report modules 26, 27, 28.

The analyzing block 21 analyzes the condition of the field devices on the basis of the data received from the core and utilizing knowledge data stored in a database 29. In a preferred embodiment of the invention, the field devices to be managed are control valves, and the analyzing block 21 determines two indexes describing the operation and condition of a control valve on the basis of the collected data: control performance index and maintenance need index.

The control performance index is a key when estimating the operation of a control valve from the viewpoint of the whole industrial process. It is used for trying to estimate the effect of the valve on process variability. The control performance index may also contain application-based data, e.g. whether the process is fast or slow. In a fast process, it is for instance important that the control valve responds to a control signal rapidly. In a slow process, respectively, a small static control error of the control valve is significant.

The maintenance need index, in turn, informs of the need of maintenance of control valves. The need of maintenance may be caused either by mechanical factors, such as wear, or by poor control performance itself. A wider diagnostics of a control valve associated with the use of the maintenance need index tries to locate also the source causing the maintenance need of the control valve, i.e. the object of maintenance.

The analyzing block 21 determines the control performance index and the maintenance need index by utilizing an expert system, whose inputs are components affecting the indexes. These components are: data to be collected from the field devices and application-based and device-/device typespecific knowledge (expertise) received from the knowledge database 29. This knowledge consists in the knowledge the field agent itself has learned and collected and, according to the basic idea of the invention, in the experience collected by other field agents in other industrial processes and in the knowledge of the performance and maintenance need of the control valves.

The controller valve is capable of collecting a large amount of different data concerning the control performance of the valve. The majority of the collected data is of on-line type, naturally. The most important parameters affecting the control performance and collectable at present already are: static error, rate of change in static error, dynamic error, rate of change in dynamic error, opening accumulation, load and rate of change in load. Correspondingly, examples of components affecting the maintenance need index are: control performance, odometer of valve, odometer of actuator, number of valve reversals, number of actuator reversals, valve seal leakage, valve emission, valve wall thickness, cavitation level, load and rate of change in load.

Figure 4A:
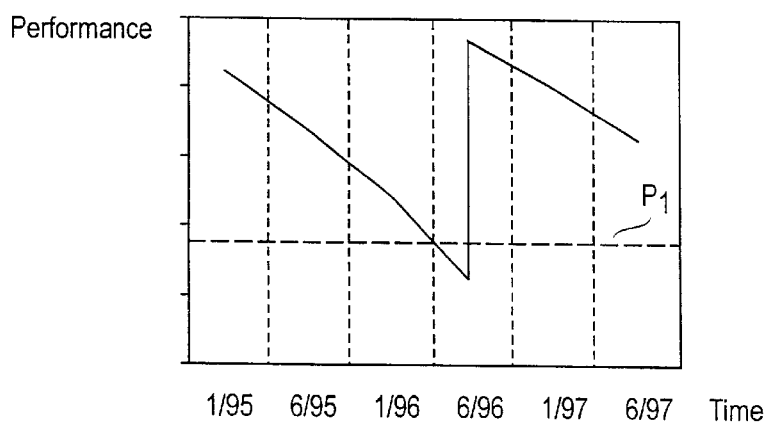
FIGS. 4A and 4B are graphical descriptors illustrating a variation in values of a performance index and a maintenance need index as a function of time.
Figure 4B:
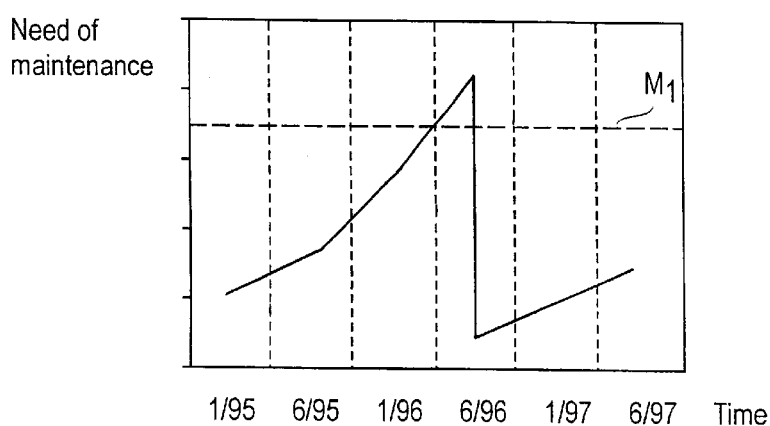

By drawing the control performance index and the maintenance need index graphically, it is possible to give the user a clear picture of the operation and condition of the valve. It is even possible to program the analyzing block 21 to predict how the indexes develop as a function of time. FIG. 4A is an example of the development of the performance index as a function of time. P1 is the minimum acceptable level, i.e. the threshold level, below which an alarm and a maintenance step are caused. FIG. 4B is an example of the development of the maintenance need index as a function of time. M1 is the maximum level of the maintenance need, i.e. the threshold level, above which an alarm and a maintenance step are caused.

The analyzing block 21 (as the whole field agent) is an independent component, which does not need outside impulses to operate. Upon commissioning, it monitors regularly, fully independently, the condition of all field devices, such as control valves, connected to the field bus. The analyzing block 21 and the whole field agent are also capable of being adapted to changing circumstances. An example of changing circumstances is a weakening performance of a predetermined control valve. A learning block 22 then changes the adaptation of an analyser in the knowledge database, the analyzing block 21 gives the core 25 a new control signal "adaptation", as a result of which the core 25 subjects said control valve to a closer monitoring, by raising its priority level, for instance, so that an alarm of a malfunction can be given in time.

The analyzing block 21 also gives analyzing results to report modules to be reported forward.

Figure 3:
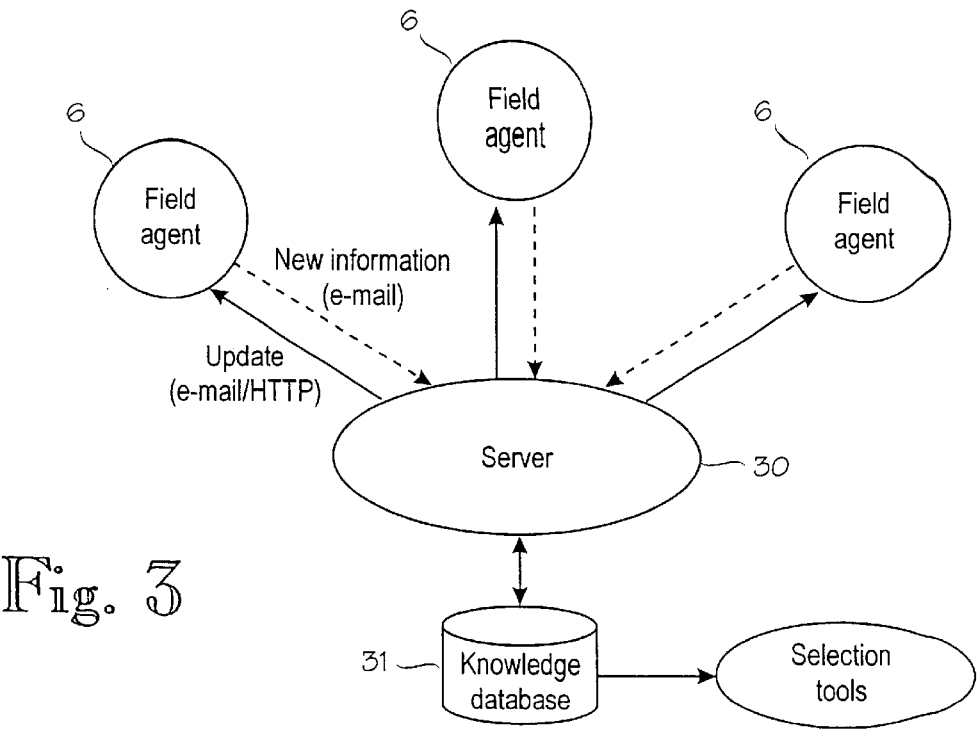
FIG. 3 illustrates a network of local maintenance management systems, i.e. field agents, according to the invention.

Though a field agent operates independently, as far as users are concerned, it maintains, however, connections according to the invention to other field agents and/or to a centralized unit, known as a field agent server 30, as in FIG. 3. This is indicated in FIG. 2 by a learning module 20. When the analyzing block 21 finds a new information (e.g. a sudden failure of a control valve of a predetermined type in certain circumstances) which could be of significance for the operation of the other field agents as well, it gives the information to the learning block 20. The learning block 20 sends the information by a suitable communication method, such as electronic mail, DDE, HTML, short message, Intranet, Internet, to the field agent server 30. For this purpose, the learning module 20 may use report modules 26 to 28. The field agent server 30 analyzes the new information by using its knowledge data base 31. If the field agent server 30 considers this to be new information of significance, it transmits the information by a suitable communication method, such as electronic mail, DDE, HTML, short message, Intranet, Internet, to the whole (e.g. world-wide) network of field agents 6. The learning block of each field agent 6 receives the information and transfers it to the knowledge data base 29. It will thus be automatically included in the data used by the analyzing block 21. If, for example, the analyzing block 21 detects an information on a weakening performance of a valve of a predetermined type in certain circumstances in the knowledge database 29, it may change the priority level of control valves of this type, i.e. the reading rate in the core 25. The information may also be a new threshold level P1 or M1, in which case the alarm limits of a field agent are controlled on the basis of information received from elsewhere. Alternatively, it is possible for the field agent server 30 to send a specific instruction in consequence of which the field agent 6 changes its operation in a desired manner.

In the above example, the field agent server 30 controls the information and communication sent by the field agents 6. Alternatively, the field agents may communicate with each other directly or via the field agent server 30 in such a way that they analyze received data independently. In the above situation, when the analyzing block 21 finds a new information (e.g. a sudden 35 failure of a control valve of a predetermined type in certain circumstances) which could be of significance for the operation of other field agents as well, it gives the information to the learning block 30. The learning block 20 locates the information in the knowledge database of the agent and transmits the information by a suitable communication method, such as electronic mail, DDE, HTML, short message, Intranet, Internet, to the whole (e.g. world-wide) network of the field agents 6. The learning block of each field agent 6 receives the information and transfers it to the knowledge database 29, as was described above.

With reference to FIG. 2 again, a report module is a program component whose task is to change a status message to a format understood by another system. The other system may be for instance a database, a control room of an automation system or a maintenance reporting system. Report modules 26 to 28 provide an open communication interface with the other system. Open communication interface signifies for instance that the communication method by which the data of the field devices are transferred to the other system is independent of the type of field device and the nature of field communication interface. A report module may be for instance an electronic mail program 27 sending the status data of the field device as an e-mail report to the other system. A report module may also be for instance a WWW (World Wide Web) server 26 creating an HTML report from the maintenance data of the field devices, which report is offered as a WWW page. The other system may then read the WWW page with a commercial browser via Intranet or Internet. A report module may also create an HTML report or another textbased report, which is sent to the other system. A report module may also store the created (for instance text-based) report in the database, from where it can be read. A report module may also be a DDE server 28 communicating with the control room or other systems over a local area network LAN, for instance. The report modules 26, 27 and 28 are preferably Windows programs, possibly commercial programs. Between the blocks 21 and 23 and the report modules 26 to 28, there is then preferably an interface according to the Distributed Component Object Model (DCOM), over which interface an event message informing of the condition of the field device can be transmitted to the report modules 26 to 28.

The blocks 21 and 23 transmit the data to be reported to a report module for instance as a text-based report or file, which the report module inserts for instance as the content of an e-mail message or a short message (e.g. GSM), which message it sends to a predetermined address or several addresses. Correspondingly, the report module may change the content of the HTML/WWW page on the basis of the received text-based data. Internet and Intranet are TCP/IP networks known per se, the most significant application of which is WWW, but which also offer other data communication services applicable to the purpose of the present invention. These are all well-known data transmission technologies, detailed information and commercial applications of them being available, for which reason it is not necessary to describe them here any further. On the whole, the basic idea of the open communication interface concept of the present invention is that any general data transmission technology supported by another system may be applied as an open interface.

It is obvious that, as the technique develops, the basic idea of the invention may be implemented in many different ways. Consequently, the invention and its embodiments are not restricted to the above examples, but they can vary within the scope of the claims.

What is claimed is:

1. A maintenance management system for maintenance management of field devices in industrial processes located in different plants at different geographical locations that are remote from each other, said maintenance management system comprising:
   a local maintenance management system in association with each of said industrial processes,
   wherein the local maintenance management systems of said industrial processes are arranged to form a network and to communicate with at least one of each other and a centralized maintenance management unit and to exchange information relating to maintenance management of the field devices to learn and utilize the information on a network level, wherein each of said local maintenance management systems is arranged to control local maintenance management parameters independently based on data collected locally and data received from local maintenance management systems of other plants.

2. A system according to claim 1, wherein said local maintenance management parameters include data representing at least one of performance and need of maintenance of a field device.

3. A system according to claim 2, wherein each of the field devices is a valve and a management parameter representing the performance comprises or is affected by one or more of a static error, a rate of change in static error, a dynamic error, a rate of change in dynamic error, an opening accumulation, a load, or a rate of change in load.

4. A system according to claim 2, wherein each of the field devices is a valve and a management parameter representing the need of maintenance comprises or is affected by one or more of a control performance, an odometer of valve, an odometer of actuator, a number of valve reversals, a number of actuator reversals, a valve seal leakage, a valve emission, a valve wall thickness, a cavitation level, a load, or a rate of change in load.

5. A system according to claim 1, wherein each of the local maintenance management systems is arranged to independently adapt the maintenance management to changes the maintenance management system has detected in properties of the field devices.

6. A maintenance management system for managing field devices in an industrial process, said maintenance management system comprising:

a communicating mechanism arranged to communicate with other maintenance management systems of industrial processes of other plants located geographically apart from each other in order to transmit and receive data which relates to a maintenance of field devices; and a maintenance management parameters adjusting mechanism arranged to adjust maintenance management parameters of field device types in a self-learning manner based on data collected locally and data received from said other maintenance management systems.

7. A system according to claim 6, wherein said maintenance management parameters comprise parameters representing performance and/or need of maintenance of the field devices.

8. A system according to claim 6 or 7, wherein the maintenance management system is arranged to independently adapt maintenance management to changes the maintenance management system has detected in the properties of the field devices.

9. A maintenance management system for maintenance management of field devices in industrial processes located at different geographical locations remote from each other, said maintenance management system comprising:

a local maintenance management system in association with each of the industrial processes, wherein the local maintenance management systems of said industrial processes are arranged to form a network and to communicate with each other and to exchange information relating to maintenance management of the field devices to learn and utilize the information on a network level, wherein each of said local maintenance management systems is arranged to control local maintenance management parameters independently based on data collected locally and data received from other local maintenance management systems, each of said local maintenance management systems comprises:

a knowledge database arranged to store knowledge types of at least one of application-specific knowledge data, field device-specific knowledge data, and field device-type specific knowledge data;

an analyzer arranged to analyze conditions of the field devices based on measurement data obtained from a respective local process and knowledge data obtained from said knowledge database, said analyzer is further able to change value of at least one maintenance parameter in the respective local process, when required according to results of an analysis; and a knowledge database controller arranged to modify content of said knowledge database based on maintenance management history data collected locally and maintenance management history data received from the other local maintenance management systems.

10. A system according to claim 9, wherein said local maintenance management parameters comprise at least one of data representing a performance of a field device, data representing a need of maintenance of a field device, a maintenance alarm threshold for a field device, a performance alarm threshold for a field device, or a maintenance priority level for a field device.

11. A system according to claim 9 or 10, wherein knowledge data comprises data representing control performance history data or maintenance-need history data of a field device, a field device type, or a process control application.

12. A maintenance management system for managing field devices in an industrial process, said maintenance management system comprising:

a maintenance management system communication mechanism arranged to communicate with respective maintenance management systems of industrial processes of other plants located geographically apart from each other in order to transmit and receive data which relates to a maintenance of field devices; and a maintenance management parameter adjusting mechanism arranged to adjust maintenance management parameters of field device types in a self-learning manner based on data collected locally and data received from said other maintenance management systems, said maintenance management system further comprising:

a knowledge database arranged to store knowledge types of at least one of application-specific knowledge data, field device-specific knowledge data, or field device-type specific knowledge data;

an analyzer arranged to analyze a condition of the field devices based on measurement data obtained from a respective local process and knowledge data obtained from said knowledge database, said analyzer is further able to change value of at least one maintenance parameter in the respective local process, when required according to results of an analysis; and a knowledge database controller to modify content of said knowledge database based on maintenance management history data collected locally and maintenance management history data received from the other maintenance management systems.

13. A maintenance management system according to claim 12, wherein said maintenance management parameters comprise at least one of data representing a performance of a field device, data representing a need of maintenance of the field device, a maintenance alarm threshold for the field device, a performance alarm threshold for the field device, and a maintenance priority level of the field device.

14. A maintenance management system according to claim 12 or 13, wherein said knowledge data includes data representing control performance history data or maintenance-need history data of a field device, field device type, or a process control application.

15. A maintenance management system according to claim 12, wherein a local maintenance management system is arranged to independently adapt to maintenance management changes that the maintenance management system has detected in properties of the field devices.

* * * * *